United States Patent

[11] 3,599,507

| [72] | Inventor | Alfred F. Exton<br>Issaquah, Wash. |
|---|---|---|
| [21] | Appl. No. | 34,011 |
| [22] | Filed | May 4, 1970 |
| [45] | Patented | Aug. 17, 1971 |
| [73] | Assignee | The Boeing Company<br>Seattle, Wash. |

[54] CABLE FAILURE COMPENSATOR
5 Claims, 2 Drawing Figs.

[52] U.S. Cl...................................................... 74/469,
74/470, 244/83
[51] Int. Cl....................................................... G05g 1/00
[50] Field of Search........................................... 74/89.2,
501, 469, 470; 244/86, 83 R, 83 D

[56] References Cited
UNITED STATES PATENTS

| 2,439,356 | 4/1948 | Arens............................ | 74/470 |
| 2,528,752 | 11/1950 | Jacobus........................ | 74/469 |
| 2,611,561 | 9/1952 | May .............................. | 74/470 X |
| 2,691,898 | 10/1954 | Morris............................ | 74/469 |
| 2,857,120 | 10/1958 | Hubbard ...................... | 244/83 D |
| 2,998,211 | 8/1961 | Evans............................ | 74/470 |

*Primary Examiner*—William F. O'Dea
*Assistant Examiner*—Thomas R. Hampshire
*Attorneys*—Glenn Orlob and Nicolaas De Vogel ABSTRACT: A pair of bellcranks rotatably positioned for disposing a clamping force against each side of a bar. Control cables are connected to the bellcranks for moving the bellcranks about their axis of rotation and thereby transfer displacement to the bar. The bar is indirectly connected to an actuating member which in turn controls the positioning of an output means. The actuating member is rotatably positioned and has a lever which has opposing spring connections so that the actuating member positions itself about is rotational axis in a center or neutral position, which can be overcome by the driving force of the bar only. Cable failure which results in cable tension loss will remove the clamping force from the bellcranks holding the bar and thereby disconnect the bellcranks from the bar so that the actuating member will center itself automatically about its axis into the neutral position advocated by the opposing spring force means connected to the actuating member lever.

INVENTOR.
ALFRED F. EXTON

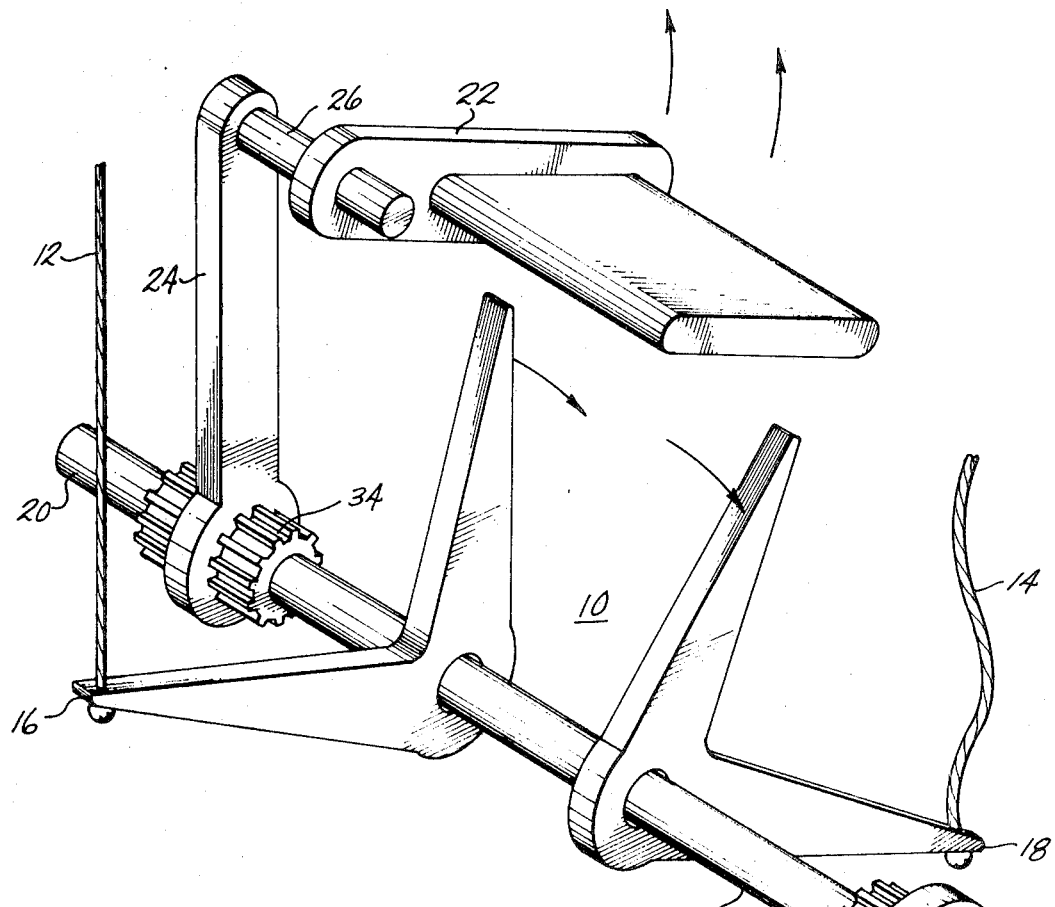
Fig. 2.
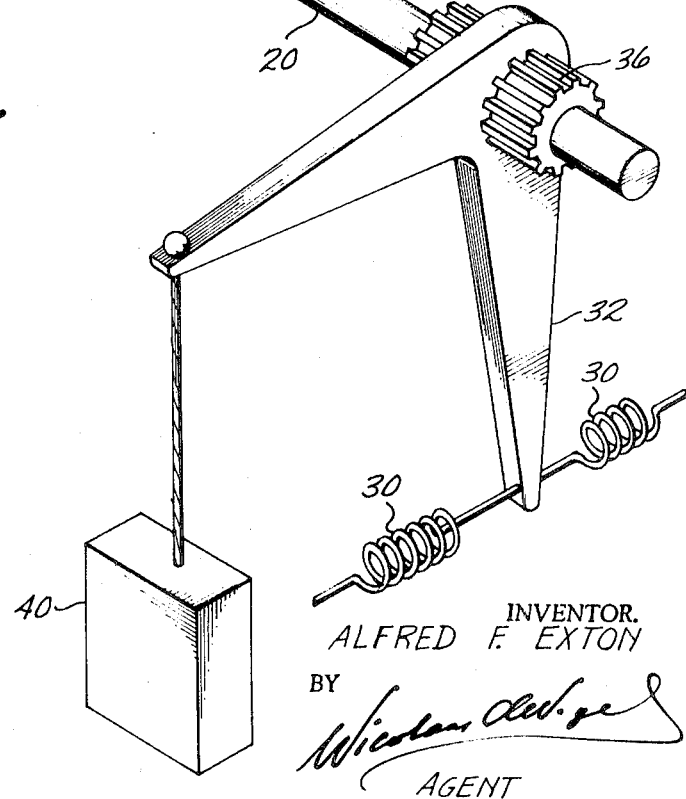

3,599,507

CABLE FAILURE COMPENSATOR

BACKGROUND OF THE INVENTION

1. Field of the Invention

This invention relates to cable control linkage mechanisms and in particular to a mechanism incorporating a safety interlocking means for returning an output means to a predetermined position upon failure of the cable linkage means. The invention is in particular suitable for control cable mechanisms used in airplanes. However, it may have application in other fields where returning of an output means or module to a neutral position as a safety feature is required.

2. Description of the Prior Art

The particular arrangement of the cable failure compensator as disclosed herein has thus far not been noted in the prior art. Various centering mechanisms for providing a "feel" to the control have been invented. However, the inherent safety feature of automatically returning or centering the control in neutral in such systems are unreliable.

For instance, in the U.S. Pat. No. 2,857,120 by H. L. HUBBARD, a self-returning or centering mechanism is disclosed and illustrated in FIG. 2. The mechanical arrangement and the various components involved decrease the reliability for safety of the overall system and especially where aircraft control mechanisms are concerned, such a reliability decrease in unacceptable.

The particular mechanical arrangement of unlocking the input action from the output activation of a cable control mechanism as explained and disclosed hereinafter is extremely reliable because the least number of components are used and the operative movements are simple, which combination is unique and novel, and therefore warrants the degree of inventiveness.

SUMMARY OF THE PRESENT INVENTION

The present invention relates to a cable control mechanism with cable failure compensator especially applicable for aircraft control systems.

The improvement relates, for example, to means for centering and returning aircraft flight surfaces to a predetermined neutral position. Under normal optimum flight conditions, the wing flaps and other flight control surfaces of an aircraft are designed to be in their neutral positions, but due to the many variables occurring in flight, such as wind gusts, direction changes, speed adjustments, as well as other reasons, it is necessary to alter the positions of these surfaces. Further, modern high-speed aircraft have incorporated into their control systems automatic equipment that makes the changes in the control surfaces as a result of the pilot's manual input being transmitted thereinto. The movement of the flight surface is caused by an actuator that receives its input via a cable and pulley mechanism from the manual input of the pilot. Therefore, the reliability of such a cable connection and control mechanism arrangement should be practically speaking 100 percent. The smallest number of components and its simplicity of operation will aid in achieving the highest reliability.

It is therefore an object of the present invention to provide for a cable failure compensator arrangement in a cable control mechanism which provides for a force-producer-centering mechanism that positively returns associated airfoil control surfaces to a neutral position with the utmost reliability.

It is a principal object of the present invention to provide for a cable failure compensator which disconnects immediately during malfunction of the transmitting or cable connecting linkage so that an absolute immediate neutral position is accomplished.

In general, the present invention provides for a control mechanism with cable failure compensator arrangement which comprises an actuating member or axle which is rotatably mounted about its longitudinal axis and which actuating member is connected to an associated control means or output module. Furthermore, lever means are secured at one end of the actuating axle for governing the rotational movement of the axle about its axis by having connected to the lever means equal opposing force-producing means such as springs for providing a neutral position to the axle, and an interlocking driving mechanism which is connected to the input control cables. This interlocking driving mechanism includes a bias driver bar which is pivotally connected to the lever and a first and second rotatably mounted bellcrank which is clamped against the driver bar to keep the driver bar in a locked connection with the lever. The dual cable connections are made to each bellcrank means and the cables are disposed under tension. Input from a control handle is carried via the cables to the bellcrank means which are clamping against the driver bar and accordingly transfer the lever into a predetermined position as directed in immediate follow-up from the control handle. In case of a failure of the cable or its associated pulleys, the cable tension which produces the clamping force to the bellcranks will disappear and the locked connection of the driver bar to the lever will become unlocked so that the actuating member or axle becomes disconnected from the control input handle and thus receives its forces from the equal opposing spring means and thus positions the actuator axle in a neutral position.

IN THE DRAWINGS

FIG. 2 is an exploded perspective view of the mechanical arrangement as shown in FIG. 1 during a failure of the cable tension.

DESCRIPTION OF THE INVENTION

Figure 1:
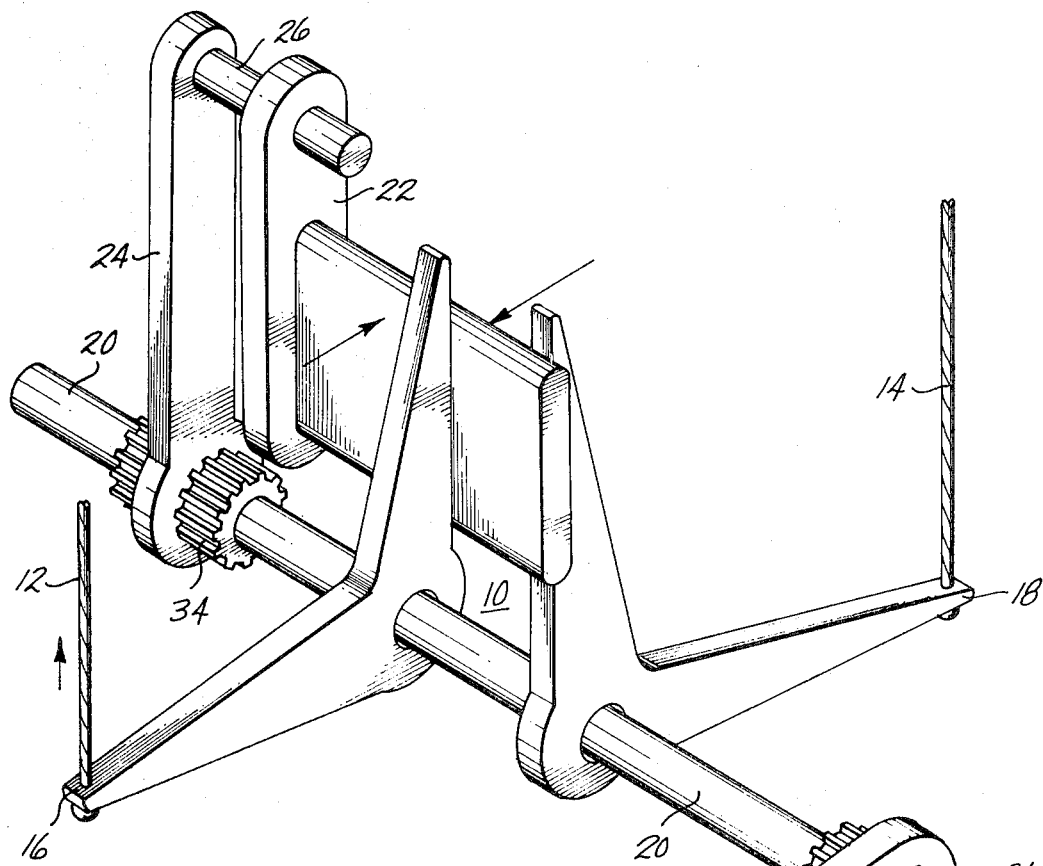
FIG. 1 is an explosive perspective view of the cable failure compensator mechanism incorporated in a cable control mechanism with an output module in its neutral or center position.
Figure 1:
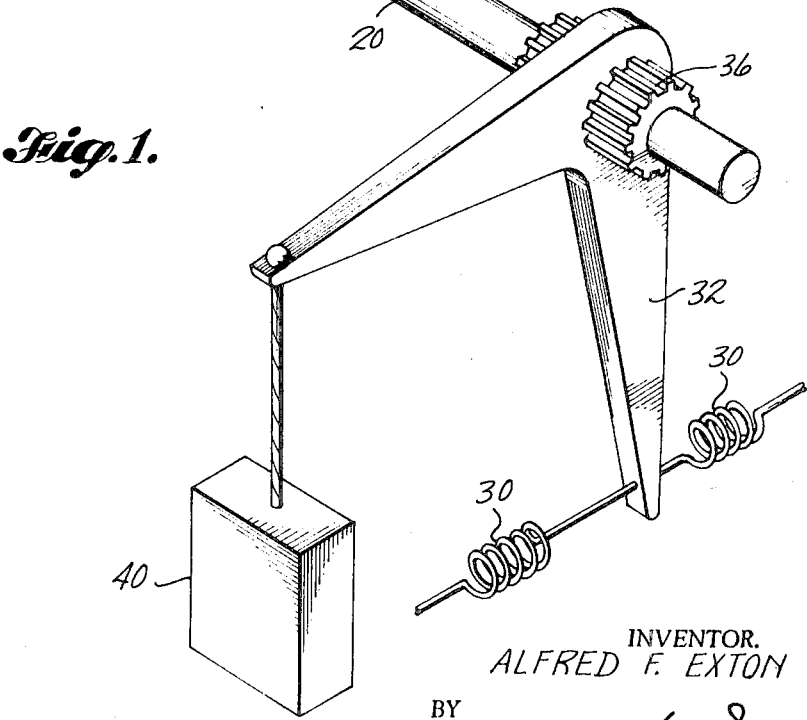

The mechanical arrangement of the cable failure compensator 10 comprises a cable 12 and 14 which is connected to a bellcrank 16 and 18. A control stick or the like mounted on a rotatable quadrant over which the cable 12 and 14 is threaded and a series of pulleys to guide the cable towards the connection points on the bellcrank 16 and 18 are not shown in the illustration, and are deemed not necessary, since such arrangements are well known in the prior art and to the persons familiar therewith.

The bellcranks 16 and 18 are rotatable connected about an actuator means or axle 20 for free rotation. The tension of the cables 12 and 14 will pull the bellcranks 16 and 18 about their pivot points and provide an opposing clamping force against the driver bar 22. The driver bar 22 acts as a locking device which will transmit input from the cables 12 and 14 via the bellcranks 16 and 18 to the actuator bar 20 by its connection with the lever 24. The driver bar 22 is connected to the lever 24 through a pivot arrangement 26. The axle 20 has a limited amount of rotation and a center position which is achieved by equal opposing forces caused by a pair of springs 30 connected to the center lever means 32. Both lever means 24 and 32 are integrally connected through a spline arrangement 34 and 36 to the actuating member or axle 20. An associated output module or means to be controlled 40 is connected to the axle 20 by the mechanical linkage of the lever 32.

During normal operation of the cable control mechanism, a change in position of the control stick (not shown) from its null or neutral position towards a position next to neutral will cause one of the cables to pull in one direction while simultaneously the other cable will travel an equal distance in the opposite direction. Thus, for instance, if the control stick is moved in a reverse from from neutral position, cable 12 will move upwards and cable 14 will move a same distance downwards. Accordingly, while still referring to FIG. 1, the bellcrank 16 and 18 and the locked-in bar 22 and its lever 24 will all move as an integral unit about the axis of the axle 20 in clockwise direction. Which consequently will move the lever 32 and its thereon connected output module 40 into an offneutral position. Likewise, when the input cable 14 is moved upwards through the activation of the control stick, the reverse of the situation and operation takes place as described above.

Referring now to FIG. 2 where a condition is illustrated which is due to a cable failure or better, severe loss of cable tension. It is assumed that cable 14 through some unfortunate circumstances loses its tension by breaking or loss of cable pulley operation or other causes. As shown, the tension in cable 12 still exists. However, the unbalance of the clamping force against the bar 22 will introduce a differential force which will disconnect the bar from the bellcranks 16 and 18 and the lever 24 by the action of bellcrank 16 swinging the bar 22 in an upwards direction as indicated by the arrow 42. The locking bar 22 will pivot about the pivot arrangement 26 on the lever 24 and therefore the lever 24 cannot receive any input from the cables via the bellcranks through the disconnection. The only forces that are applied to the actuating axle 20 are now solely from the opposing equal spring forces 30 and applied against the lever 32 which accordingly retains or moves the actuating axle 20 into its neutral or centered position which is coincident with the center or null position of the output module 40.

It should be understood that the illustration shown in FIG. 1 and 2 relates to a preferred mechanism which however can be varied several ways; for instance the lever means 24 and 32 instead of being two separate levers which are splined by spline means 34 and 36 onto the axle 20 could be changed into a one lever or integrally connected part. Also, it is definitely not necessary that the bellcranks 16 and 18 are pivoting about the actuating axle 20 and could for other reasons pivot about a secondary axis or individual axes. The perpendicularly positioned integrally connected member or flange 46 connected onto the bar 22 could be replaced by a pair of pins as used in the pivot arrangement 26. However, all these types of modifications and changes to the presented illustration and mechanical arrangement are obvious to anyone familiar with the art of control mechanisms.

It should therefore be understood that various modifications to this preferred embodiment are obvious, especially in relationship to the structural details without departing from the spirit and scope of the present invention as claimed by the appended claims.

Now, therefore, I claim:

1. A control mechanism with cable failure compensator arrangement comprising,
   a. an actuating member for actuating associated means in a neutral position and in positions next to neutral upon activation input from an associated control means, said actuating member being rotatably mounted for rotation about an axis,
   b. lever means secured to said actuating member for governing said actuating member rotational movement about said axis,
   c. equal opposing force-producing means connected to said lever means for providing said neutral position to said actuating member,
   d. an interlocking driving mechanism including a biased driver bar pivotally connected to said lever means and a first and a second rotatably mounted bellcrank means for clamping said biased driver bar in locked connection with said lever means, and
   e. a cable connected and disposed under tension between said first bellcrank means, said control means and said second bellcrank means for providing said clamping force and for transferring said input from said control means via said cable and said interlocking mechanism and said actuating member to position said associated means whereby upon failure of said cable tension said clamping force of both said bellcrank means disappears and said biased driver bar locked connection becomes unlocked so that said actuating member becomes disconnected from said control means and is positioned in said neutral position by said equal opposing force-producing means.

2. A control mechanism with cable failure compensator arrangement as claimed in claim 1 wherein said actuating member comprises an axle having said lever means secured in an integral manner onto said axle.

3. A control mechanism with cable failure compensator arrangement as claimed in claim 2 wherein said first and said second rotatably mounted bellcrank means are rotatably mounted about said actuating axle.

4. A control mechanism with cable failure compensator arrangement as claimed in claim 3 wherein said lever means comprises a first lever means having connected thereon said pivoting arrangement for interlocking said bias driver bar on one side of said first and second bellcrank arrangement and a second lever means disposed integrally on said axle for receiving said opposing spring means for centering said axle in a neutral position so that a balanced force and torque situation onto said actuating axle is achieved.

5. A control mechanism with cable failure compensator arrangement comprising:
   a. an axle for driving an associated module in various positions including a neutral position upon input from an associated control component, said axle being mounted for rotation about its longitudinal axis,
   b. a member, substantially perpendicularly secured to said axle for producing rotation to said axle about said axis via inherent lever action force of said member, and for receiving a neutral positioning force for said axle in cable failure instances,
   c. neutral force producing means connected to said member for creating said neutral position to said axle,
   d. an interlocking driving mechanism including a driving bar rotatably engaged for disconnection purposes to said member and a first and second rotatably mounted bellcrank, each provided with a first and second leg having each said first leg disposed against said bar from opposite directions for holding said bar so that said bar is locked by said rotatable engagement and said bellcrank first legs,
   e. cable means connected and disposed under tension between said first bellcrank second leg, said control component and said second bellcrank second leg for transferring said input from said control component via said cable means and said interlocking driving mechanism to said axle whereby upon cable failure said cable means tension will be lost and said first legs holding force of said bellcranks become disconnected from said bar thereby unlocking said interlocking means from said member and said axle so that said axle becomes disconnected from said control component and receives neutral position force to position said axle about said axis in neutral.